Oct. 25, 1966  J. W. ENDRESS  3,280,576
REFRIGERATION LUBRICATION SYSTEM AND METHOD
Filed July 26, 1965

INVENTOR.
JAMES W. ENDRESS.
BY Robert F. Ruemel
ATTORNEY.

United States Patent Office 3,280,576
Patented Oct. 25, 1966

3,280,576
REFRIGERATION LUBRICATION SYSTEM AND METHOD
James W. Endress, Syracuse, N.Y., assignor to Carrier Corporation, Syracuse, N.Y., a corporation of Delaware
Filed July 26, 1965, Ser. No. 474,791
12 Claims. (Cl. 62—84)

This invention relates to a refrigeration machine including an improved system and method of lubrication and, more particularly, to such a system and method for effectively preventing foaming of the lubricant when starting the machine.

The foaming of lubricant in a refrigeration machine is undesirable because it may result in oil pump cavitation and loss of oil through vent lines and labyrinths and carry-over into the refrigerant circuit resulting in insufficient oil for adequate lubrication of ports such as bearings. Foaming is most obvious at start-up of the machine because during shutdown the pressure on the lubricant and refrigerant is generally substantially higher than during cooling operation, resulting in the lubricant absorbing a large quantity of refrigerant which is readily released when the lubricant is subsequently exposed to lower pressure at start-up of the machine.

It is a primary object of this invention to provide a refrigeration machine including a new and improved system and method of lubrication.

The invention is directed to a refrigeration machine including a lubrication system utilizing a lubricant miscible with a refrigerant in the machine. The machine has a relatively low pressure first zone containing a supply of lubricant and a second zone requiring lubrication and adapted to contain refrigerant. The second zone is normally at a relatively low pressure during operation of the machine and at a relatively higher pressure when the machine is inoperative. During operation lubricant is circulated between the zones to lubricate the machine. When said machine is shut down, the zones are segregated for preventing the passage of refrigerant into the first zone, thereby substantially preventing the lubricant in said first zone from absorbing refrigerant when the machine is inoperative.

Figure 1:
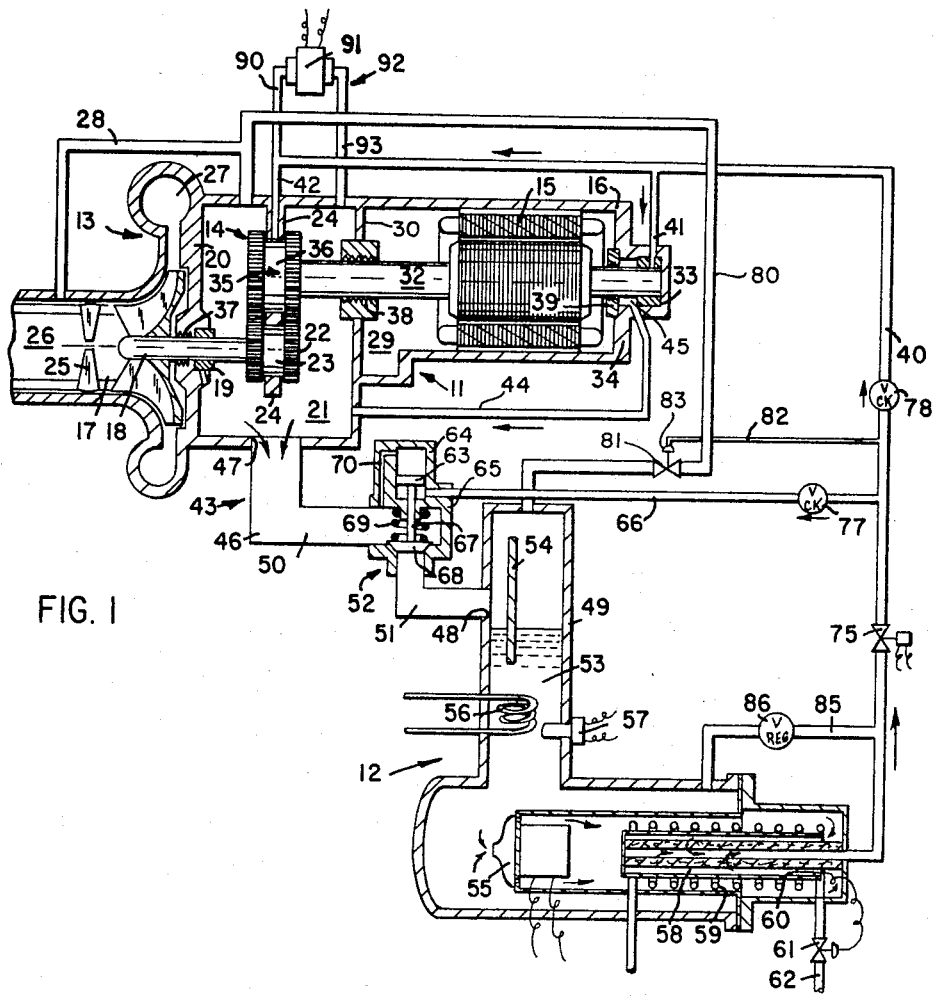
Figure 2:
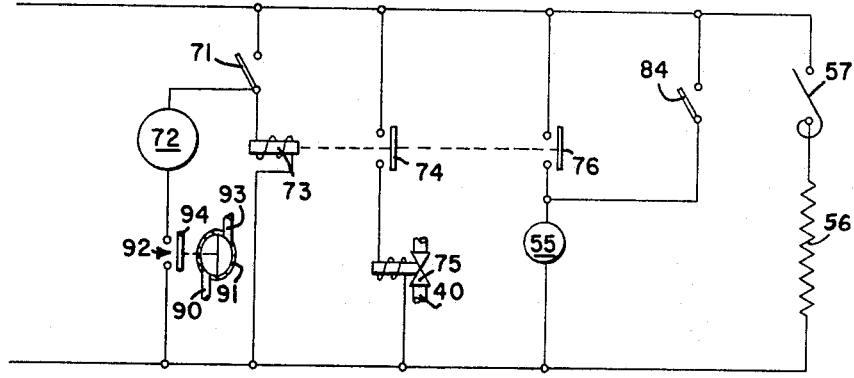

Other objects and advantages of the invention will be apparent from the following description and drawing in which:

FIGURE 1 is a fragmentary schematic view of a portion of a refrigeration machine and includes a flow diagram of a lubrication system of the machine; and FIGURE 2 is a schematic wiring diagram of a portion of a control system of the machine.

Referring to the drawing, FIGURE 1 illustrates a portion of a refrigeration machine including a motor compressor unit 11 and a lubrication unit 12 for lubricating the motor compressor unit 11 during cooling operation of the machine.

The motor compressor unit 11 includes a refrigerant compressor 13 which may be driven through a transmission 14 by an electric motor 15. A housing 16 encloses the compressor, the transmission and motor. A centrifugal compressor 13 is illustrated and has a suitable rotor 17 mounted on a rotor shaft 18 journaled in a first bearing 19 seated in a first partition 20 separating the compressor from a chamber 21 about the transmission 14. A pinion 22 is on a free end of the shaft 18 within the transmission chamber 21 and provides a second rotor shaft bearing 23 seated in a web 24 fixedly mounted on the inside of the housing 16 in any suitable manner. Cooling capacity control may be provided by guide vanes 25 downstream of the rotor within the compressor inlet 26 which is connected with an evaporator (not shown) through a suction line (not shown). From the compressor rotor 17 compressed refrigerant vapor passes through a discharge scroll 27 in the compressor body and then through a compressor outlet (not shown) to a suitable refrigerant condenser (not shown) from which refrigerant condensate is metered back to the evaporator. An equalizer line 28 extends between the compressor inlet 26 and the transmission chamber 21 so that the chamber is substantially at the same relatively low pressure as the suction line and the compressor inlet during cooling operation of the machine.

The electric motor 15 is within a motor chamber 29 separated from the transmission chamber by a second partition 30 of the housing 16. Refrigerant may be circulated in the chamber 29 for cooling the motor. A motor shaft 32 is mounted in a bearing 33 seated in a right end wall 34 of the housing 16, and this shaft carries a gear 35 at its opposite end which is within the transmission chamber 21. The gear 35 is drivingly meshed with the pinion 22. A shaft bearing 36 is seated in the web 24.

A labyrinth 37 is provided about the rotor shaft 18 at the first partition 20 and between the bearing 19 and the compressor rotor 17 to retard passage of refrigerant from the compressor 13 into the transmission chamber 21. A second labyrinth 38 is provided in the second partition 30 for retarding the passage of refrigerant between the transmission chamber 21 and the motor chamber 29, and a third labyrinth 39 is provided in the housing end wall 34 inwardly of the motor shaft bearing 33 for effectively preventing the passage of lubricant from the bearing into the motor chamber 29.

During cooling operation of the refrigeration machine, lubricant is provided to the bearings 19, 23, 33, and 36 and to the gear 35 and pinion 22 through passage means including a lubricant supply conduit 40 from the lubrication unit 12 to a first branch 41 extending from the supply conduit 40 to the end wall motor bearing 33 and a second branch 42 extending from the lubricant supply conduit 40 through the web 24 for lubricating the gear 35 and pinion 22 and their bearings 36 and 23, and while not shown, also extending through suitable portions of the motor housing 16 for lubricating the compressor rotor shaft bearing 19.

The passage means also includes lubricant return conduit means 43 including the transmission chamber 21, a line 44 discharging into the transmission chamber from a lubricant collection chamber 45 about the motor shaft between the end wall bearing 33 and the adjacent labyrinth 39, and a suitable passage 46 between a discharge port 47 in the bottom of the transmission chamber 21 and an inlet port 48 in a housing 49 of the lubrication unit 12. A first or shut-off valve 52 is in the passage 46 and is open during cooling operation of the refrigeration machine and is normally closed when the compressor is shut-down. Lubricant returning to the lubrication unit 12 passes through the inlet port 48 in the lubrication unit and into a lubricant reservoir 53 within the housing 49. A suitable baffle 54 is provided for retarding splashing of the lubricant. Within the reservoir 53 is a motor driven oil pump 55 for circulating lubricant from reservoir 53 through the lubricant supply conduit 40 to the motor compressor unit 11.

As is understood in the art, most lubricants used in refrigerant compressors are miscible with refrigerant used in the machine. By providing a relatively low pressure in the lubrication system during cooling operation, that is the suction pressure applied through the equalizer line 28 to the transmission chamber and through the passage 46 to the lubrication unit 12, the lubricant absorbs very little refrigerant. Refrigerant may enter the transmission chamber through the equalizer line 28 and the compressor labyrinth 37. To further reduce the quantity of refrigerant carried by the lubricant, particularly after a prolonged shut-down, a suitable heater, such as an electric emersion heater 56 in the reservoir 53 may be employed to heat the lubricant to drive off refrigerant therein. The temperature of the heater 56 may be controlled in any suitable manner as by a temperature sensor 57 in the lubricant and preferably maintains the lubricant at about 150° F., which is about the temperature at which the lubricant leaves the bearings. From the heater 56, the oil in the reservoir 53 passes through the oil pump 55 and then through a filter 58, and it is cooled by a suitable cooling coil 59, for example a coil through which water or refrigerant is circulated. The temperature of the cooled oil is controlled by a suitable temperature sensor 60 for controlling a modulating water valve 61 on an inlet water line 62 to the coil 59.

The shut-off valve 52 in the lubricant return conduit 43 is maintained open for the passage of lubricant into the reservoir 53 during normal cooling operation of the refrigeration machine by operating means responsive to lubricant pressure applied to the under side of an operating piston 63 within a cylinder 64 in a housing 65 of the valve. The lubricant pressure is applied through an operating line 66 between the lubricant supply conduit 40 and the bottom portion of the cylinder 64. The piston 63 is fixed to an upper end of a valve stem 67 which is fixed at its lower end to a valve head 68 associated with a seat on the housing 65. The piston acts against an opposing, closing force of a compression spring 69 about the valve stem 67, and this spring is seated between an inner wall of the housing 65 and the valve head 68. An equalizer passage 70 extends from an upper portion of the cylinder 64 to the inlet of the valve so that the upper portion of the cylinder is substantially at the same pressure as the transmission chamber.

With reference to both FIGURES 1 and 2, when it is desired to shut down the refrigeration machine, a manually operated stop-start switch 71 is opened to break an actuating circuit to a compressor motor controller 72 to permit the motor compressor unit 11 to coast to a stop. Opening of the stop-start switch 71 also breaks a circuit to a solenoid-actuated time delay relay assembly 73. The relay 73 is instant closing and preferably has about a 15 to 30 second opening delay so that relay contacts 74 in circuit with a solenoid-actuated valve 75 in the lubricant supply conduit 40 upstream of the operating line 66 to the shut-off valve 52, remain closed a short period of time after the start-stop switch 71 is opened. Second contacts 76 of the time delay relay 73 are in circuit with the motor of the oil pump 55 and also remain closed thereby continuing the circulation of lubricant through the lubrication system as the motor 15 and rotor 17 of the motor compressor unit 11 coast to a stop.

When the contacts 74 and 76 of the time delay relay 73 open about 15 seconds after opening the start-stop switch 71, the solenoid-operated valve 75 in the lubricant supply conduit 40 closes and the oil pump 55 stops. Oil pressure then drops in the operating line 66 to the shut-off valve cylinder and a check valve 77 in this line prevents reverse flow through the line from the valve cylinder 64 into the lubricant supply conduit 40. Another check valve 78 in the lubricant supply conduit 40 is downstream of the solenoid-operated shut-off valve 75 and the operating line 66 to prevent reverse flow of lubricant and flow of high pressure refrigerant from the motor compressor unit 11 to the lubrication unit 12, upon shut-down. Leakage of oil and refrigerant about the operating piston 63 of the shut-off valve 52 provides a dash-pot action and causes the shut-off valve to close slowly permitting lubricant to return through the passage 46 from the motor compressor unit 11 to the lubricant reservoir 53 upon shut-down of the machine.

An equalizer or vent line 80 between the top of the lubricant reservoir 53 and the equalizer line 28 between the compressor inlet 26 and the transmission chamber 21 is open during operation of the machine and is closed at shut-down by means of a second or vent valve 81 in the vent line 80. An operating line 82 connects a diaphragm actuator 83 of this valve and the lubricant supply conduit 40 between the solenoid-operated shut-off valve 75 and the check valve 78 so that the vent valve opens as the pressure builds up in the supply conduit 40.

During shut-down of the machine, the oil heater 56 is in operation and therefore is connected in the control circuit separately from the start-stop switch 71. In order to maintain a generally equal lubricant temperature throughout the lubricant in the reservoir during shut-down, a manually operated switch 84 (FIGURE 2) may be closed when the start-stop switch 71 is open for operating the oil pump 55 to circulate oil through a bypass line 85 between the lubricant supply conduit upstream of the solenoid-operated valve 75 and the reservoir 53. During operation of the compressor a pressure regulating valve 86 in the bypass line 85 provides a lubricant supply pressure in the supply conduit 40 about 25 p.s.i. above the pressure in the reservoir 53.

Thus, during shut-down of the refrigeration machine the lubricant reservoir 53 is segregated by the valves 52, 75, and 81 from the remainder of the machine for effectively preventing the entry of refrigerant into the reservoir 53. For example, when using refrigerant R12, during operation of the machine the compressor inlet pressure may be 46 p.s.i.a. which is also the pressure in the transmission chamber 21 and in the lubricant reservoir 53, and the lubricant may carry about 5% absorbed refrigerant. Upon shut-down of the machine, the pressure in the lubricant reservoir may rise slightly above a suction pressure of 46 p.s.i.a. because of an increase of the compressor inlet pressure as the compressor 13 coasts to a stop before closing of the shut-off valve 52 in the lubricant return passage 46. However, the pressure throughout the refrigerant circuit may rise as high as about 151 p.s.i.a. at an ambient temperature of 110° F., and this pressure would cause the lubricant to absorb a large quantity of refrigerant, possibly 20% refrigerant, if the lubricant were exposed to this pressure in the presence of the refrigerant.

Upon normal start-up of the refrigeration machine, the start-stop switch 71 is closed thus energizing the time delay relay 73 and instantly closing its two contacts 74 and 76 thereby opening the solenoid-operated shut-off valve 75 and starting the oil pump 55 for circulating lubricant through the lubricant supply conduit 40 to the bearings and gear and pinion in the motor compressor unit 11. The lubricant pressure is applied through the operating line 82 to first open the vent valve 81 in the vent line 80 between the lubricant reservoir 53 and the equalizer line 28 of the motor compressor unit so that the lubricant reservoir 53 and the transmission chamber 21 are then substantially at the same pressure. As the lubricant pressure in the lubricant supply conduit 40 and the line 66 continues to increase, the operating piston 63 of the shut-off valve 52 in the lubricant return passage 46 will rise against the force of the closing spring 67 so that lubricant may return through the passage 46 to the reservoir 53. The shut-off valve spring 69 is so calibrated that the pressure in the upper portion of the cylinder 64, which is as high as the pressure in the transmission chamber 21 because of the interconnection through the equalizer line 70 and the passage 46, must be reduced as by equalizing the pressures in the reservoir 53 and the transmission chamber 21 through the vent line 80, before the shut-off valve 52 may open responsive to normal lubricant supply pressure applied to the underside of the operating piston 63 through the operating line 66 from the lubricant supply conduit 40. When the pressure in the lubricant supply conduit 40 rises sufficiently to assure adequate lubrication for the motor compressor unit 11, a differential in pressure results between the lubricant supply conduit 40 and the transmission chamber 21. A line 90 from the lubricant supply conduit 40 to a differential pressure actuator 91 of a motor starter contact assembly 92, and a line 93 from the chamber 21 to the actuator 91 causes contacts 94 of this assembly, in circuit with the motor controller 72, to close thus starting the compressor motor 15 to drive the compressor 13 and through the equalizer line 28 to reduce the pressure in the transmission chamber 21 to the normal operating pressure. Thus, at start-up of the refrigeration machine, lubricant from the reservoir 53 has its pressure increased as it passes through the oil pump 55 and this increase in pressure is maintained until the lubricant passes to the bearings 19, 23, 33, and 36, and gear 35 and pinion 22 in the motor compressor unit 11. However, the pressure in the transmission chamber 21 and in the lubricant return conduit 46 generally, is always greater than or at least equal to the pressure in the lubricant reservoir 53 so that any refrigerant absorbed by the lubricant in the reservoir 53 does not flash and cause foaming of the lubricant. Furthermore, by increasing the temperature of the lubricant in the reservoir by means of the heater 56, refrigerant is driven out of the lubricant to further effectively prevent flashing and resultant foaming.

While a preferred embodiment of the invention has been described and illustrated, it should be understood that the invention is not limited thereto but may be otherwise embodied within the scope of the following claims.

I claim:

1. In a refrigeration machine for circulating a refrigerant to provide cooling, a lubrication system utilizing a lubricant miscible with the refrigerant, said system comprising, a relatively low pressure reservoir containing a supply of lubricant, a zone containing means requiring lubrication and adapted to contain refrigerant, said zone being normally at a relatively low pressure during operation of the machine and at a relatively higher pressure when the machine is inoperative for cooling, and passage means for circulating lubricant between said reservoir and said zone to lubricate said means requiring lubrication whereby the lubricant absorbs but a small quantity of refrigerant during normal operation of the machine, and segregating means for effectively preventing passage of refrigerant into said reservoir when said machine is shut down and retaining said reservoir at a relatively low pressure when said zone is at a relatively higher pressure thereby substantially preventing refrigerant from entering said reservoir when the machine is inoperative.

2. The machine of claim 1 wherein said passage means includes lubricant supply conduit means for the passage of lubricant from said reservoirs to said zone, means for passing lubricant through said lubricant supply conduit means to said zone at a suitable lubricant supply pressure, and lubricant return conduit means for the passage of the lubricant from said zone to said reservoir.

3. The machine of claim 2 wherein said segregating means comprises first valve means in said lubricant return conduit means, said first valve means being normally closed when the machine is inoperative for cooling, operating means operable upon starting the machine from normal shut-down conditions for opening said first valve means responsive to said lubricant flowing through said lubricant supply conduit means to said zone and equalizing means for substantially equalizing the pressures in said reservoir and said zone.

4. The machine of claim 3 in which said equalizing means comprises a vent conduit between said reservoir and said zone, normally closed second valve means in said vent conduit, and means for opening said second valve means responsive to said lubricant flowing through said lubricant supply conduit means to said zone.

5. The machine of claim 4 in which said operating means are operable for retaining said first valve means open responsive to lubricant flowing through said lubricant supply conduit means during cooling operation of the machine.

6. In a refrigeration machine for circulating a refrigerant to provide cooling, a lubrication system utilizing a lubricant miscible with the refrigerant, said system comprising a relatively low pressure reservoir for containing a supply of lubricant, a zone containing means requiring lubrication and adapted to contain refrigerant, said zone being normally at a relatively low pressure during operation of the machine and at a relatively higher pressure when the machine is inoperative for cooling, passage means for circulating lubricant between said reservoir and said zone to lubricate said means whereby the lubricant absorbs but a small quantity of refrigerant during normal operation of the machine, segregating means for effectively preventing passage of refrigerant into said reservoir when said machine is shut down and retaining said reservoir at a relatively low pressure when said zone is at a relatively higher pressure thereby substantially preventing refrigerant from entering said reservoir when the machine is inoperative, said passage means including lubricant supply conduit means for the passage of lubricant from said reservoir to said zone, means for passing lubricant through said lubricant supply conduit means to said zone at a suitable lubricant supply pressure, and lubricant return conduit means for the passage of the lubricant from said zone to said reservoir; said segregating means comprising first valve means in said lubricant return conduit means, said first valve means being normally closed when the machine is inoperative for cooling, operating means operable upon starting the machine from normal shut down conditions for opening said first valve means responsive to said lubricant flowing through said lubricant supply conduit means to said zone; equalizing means for substantially equalizing the pressures in said reservoir and said zone, said equalizing means comprising a vent conduit between said reservoir and said zone, normally closed second valve means in said vent conduit, and means for opening said second valve means responsive to said lubricant flowing through said lubricant supply conduit means to said zone; and third valve means in said lubricant supply conduit means open during operation of the machine and operable to closed position upon shut-down of the machine for stopping the passage of lubricant through said supply conduit means to said zone thereby permitting the first and second valve means to close and isolate said reservoir from said zone.

7. The machine of claim 6 in which means are provided for delaying closing of said first valve means for a short period of time after closing of said third valve means to permit lubricant to pass through said lubricant return conduit means into said reservoir upon shut-down of the machine.

8. The machine of claim 7 in which means are provided for heating the lubricant in said reservoir, and cooling means for cooling the heated lubricant.

9. In a refrigeration machine a lubrication system including a reservoir at a relatively low pressure for lubricant miscible with refrigerant in the machine, a zone including means requiring lubrication and in communication with said reservoir and substantially at said relatively lower pressure during operation of the machine and normally at a substantially higher pressure when said machine is inoperative for cooling, supply means operative for passing said lubricant from said reservoir to said zone at a pressure above that in said first zone to provide lubrication for said means requiring lubrication during operation of said machine, means for the passage of substantially all of said lubricant to said reservoir as said machine is shut down, means for effectively preventing passage of refrigerant into said reservoir when said machine is shut down, thereby effectively preventing entry of refrigerant into said reservoir during shut-down and resultant foaming of the lubricant upon restarting of the machine.

10. A method of providing lubrication in a refrigeration machine utilizing a refrigerant and a lubricant miscible with the refrigerant, and said machine having a lubrication system at least in part exposed to the refrigerant and including a first zone at a relatively low pressure for containing a supply of lubricant and a second zone requiring lubrication and normally at a relatively higher pressure when the machine is shut down, said method comprising the steps of circulating lubricant between said zones for lubricating the machine, providing a relatively lower pressure in said zones during cooling operation of the machine, thereby effectively preventing the lubricant from absorbing substantial quantities of refrigerant, shutting down the machine and substantially concurrently passing substantially all of the lubricant from said second zone to said first zone, and then effectively preventing the passage of refrigerant into said first zone during shut-down, thereby effectively preventing the lubricant from absorbing the refrigerant during shut-down, and upon starting the machine passing lubricant from said first zone to said second zone and substantially concurrently effectively equalizing the pressures in said zones at a pressure intermediate the zone pressures during shut-down, whereby during start-up the pressure of the lubricant is above the pressure in said first zone during shut-down, thereby effectively preventing flashing of refrigerant in the lubricant and foaming of the lubricant in said first zone at start-up of the machine.

11. A method of providing lubrication in a refrigeration machine utilizing a refrigerant and a lubricant miscible with the refrigerant, and said machine having a lubrication system at least in part exposed to the refrigerant and including a reservoir at a relatively low pressure for containing a supply of lubricant and a zone including means requiring lubrication and at a relatively higher pressure when the machine is shut down, said method comprising the steps of circulating lubricant between said reservoir and said zone for lubricating said means requiring lubrication, providing a relatively lower pressure in said reservoir and said zone during cooling operation of the machine, thereby effectively preventing the lubricant from absorbing substantial quantities of refrigerant, shutting down the machine and substantially concurrently passing substantially all of the lubricant from said zone to said reservoir and then effectively preventing the passage of refrigerant into said reservoir, thereby effectively preventing foaming of the lubricant at start-up.

12. A method of providing lubrication in a refrigeration machine utilizing a refrigerant and a lubricant miscible with the refrigerant, and said machine having a lubrication system at least in part exposed to the refrigerant and said system including a first zone at a relatively low pressure for containing a supply of lubricant and a second zone requiring lubrication and at a relatively higher pressure when the machine is shut down, said method comprising the steps of circulating lubricant between said zones for lubricating the machine and providing a relatively lower pressure in said zones during cooling operation of the machine, thereby effectively preventing the lubricant from absorbing substantial quantities of refrigerant, retaining substantially all of said lubricant in said first zone during shut-down, and upon starting the machine passing lubricant from said first zone to said second zone and substantially concurrently effectively equalizing the pressures in said zones at a pressure intermediate the zone pressures during shut-down, whereby during start-up the pressure of the lubricant is above the pressure in said first zone during shut-down, thereby effectively preventing flashing of refrigerant in the lubricant and foaming of the lubricant at start-up.

References Cited by the Examiner
UNITED STATES PATENTS

| | | | |
|---|---|---|---|
| 2,145,354 | 1/1939 | Hull | 62—193 |
| 2,762,204 | 9/1956 | Hanson | 62—193 |
| 3,081,604 | 3/1963 | Namisniak et al. | 62—84 |
| 3,200,603 | 8/1965 | Wake et al. | 62—84 |

ROBERT A. O'LEARY, *Primary Examiner.*

W. E. WAYNER, *Assistant Examiner.*